SIGNAL TO NOISE MEASURING IN FREQUENCY MULTIPLEX SYSTEM

Filed April 18, 1968 2 Sheets-Sheet 1

INVENTOR
O. J. FARMER
BY R C Lipton
ATTORNEY

SIGNAL TO NOISE MEASURING IN FREQUENCY MULTIPLEX SYSTEM

Filed April 18, 1968

2 Sheets-Sheet 2

United States Patent Office 3,514,542

Patented May 26, 1970

3,514,542

SIGNAL TO NOISE MEASURING IN FREQUENCY MULTIPLEX SYSTEM

Owen J. Farmer, Old Bridge, Madison Township, N.J., assignor to Bell Telephone Laboratories, Incorporated, Murray Hill and Berkeley Heights, N.J., a corporation of New York Filed Apr. 18, 1968, Ser. No. 722,308
Int. Cl. H04j *1/16*
U.S. Cl. 179—15 6 Claims

ABSTRACT OF THE DISCLOSURE

The power in the narrow frequency bands between signal channels, called slots, is measured by multiplying the composite carrier signal with a square wave whose harmonics coincide with the slot center frequencies. The multiplication is provided by a chopper which translates the slot center frequencies down to DC and sums the signals so that the low portion of the frequency spectrum at the output of the chopper represents the total slot power. A preemphasis circuit is inserted in the signal path before the chopper to compensate for the inherent fall-off of slot power with increasing slot frequency at the chopper output. The chopper output is passed through a low-pass filter to eliminate signals arising from the channel spectrums. The slot power, which is normally low and increases with increasing noise level, then operates a threshold circuit when the noise level is excessive.

FIELD OF THE INVENTION

This invention relates to test monitors for carrier transmission systems and, more particularly, to arrangements for estimating the signal-to-noise ratio in a composite frequency multiplex signal.

DESCRIPTION OF THE PRIOR ART

Receivers that detect the presence of carrier signals on an incoming transmission line must distinguish between legitimate signals and noise. It is, therefore, preferable to provide a system alarm when the noise on the carrier facility becomes excessive and precludes signal detection.

In carrier systems, it can reasonably be expected that the peak signal power is within the signal band while noise peaks occur indiscriminately across the frequency spectrum. It is conventional, therefore, to measure the power in an out-of-band "slot" and compare this power with the total power on the line. If the ratio of slot power to total power exceeds a predetermined threshold, it is judged that the noise is excessive.

If the facility comprises a frequency multiplex carrier system, slot power can be measured by detecting the power between the signal channels. Since the noise spectrum is not necessarily flat, it is advantageous to observe a plurality of these "slots" between channels. The total slot power observed can then be compared with the system power to determine if the noise is excessive.

In the observance of slot power in composite frequency multiplex systems, it has been suggested that there be provided an individual filter for each slot to filter out each slot signal or, alternatively, there be provided a step-frequency oscillator to sucessively generate the mid-frequency of each slot to translate down the slot power to a DC signal. Filters and oscillators of this type, however, are complex and expensive relative to the desired objective of determining system noise.

Accordingly, it is an object of this invention to determine system noise without requiring complex and expensive circuitry and components.

SUMMARY OF THE INVENTION

The present invention contemplates the monitoring of slots in a frequency multiplex system between successive individual signal channels, or between successive double width channels, etc. In any event, the center frequencies of the successive pairs of slots that are monitored are separated by an identical number of Hertz.

In accordance with an illustrative embodiment of this invention, the carrier signal is multiplied with a locally generated wave having odd harmonics which coincide with the center frequencies of the slots to be measured. This translates each slot signal down to near DC. The local wave source comprises a square wave generator and multiplication is provided by a square wave chopper. Preemphasis of the incoming carrier compensates for the inherent fall-off of slot power with increasing slot frequency at the output of the chopper.

The square wave chopper output comprises a sum of the slot powers. This output is passed through a low-pass filter to eliminate signals due to the channel spectrums and to thus obtain a pure cumulative slot power signal.

The foregoing and other objects and features of this invention will be more fully understood from the following description of an illustrative embodiment thereof taken in conjunction with the accompanying drawings.

BRIEF DESCRIPTION OF THE DRAWING

In the drawing, FIG. 1 and FIG. 2, when arranged side by side, disclose circuits for measuring noise in a frequency multiplex system in accordance with this invention.

DETAILED DESCRIPTION

Figure 1:
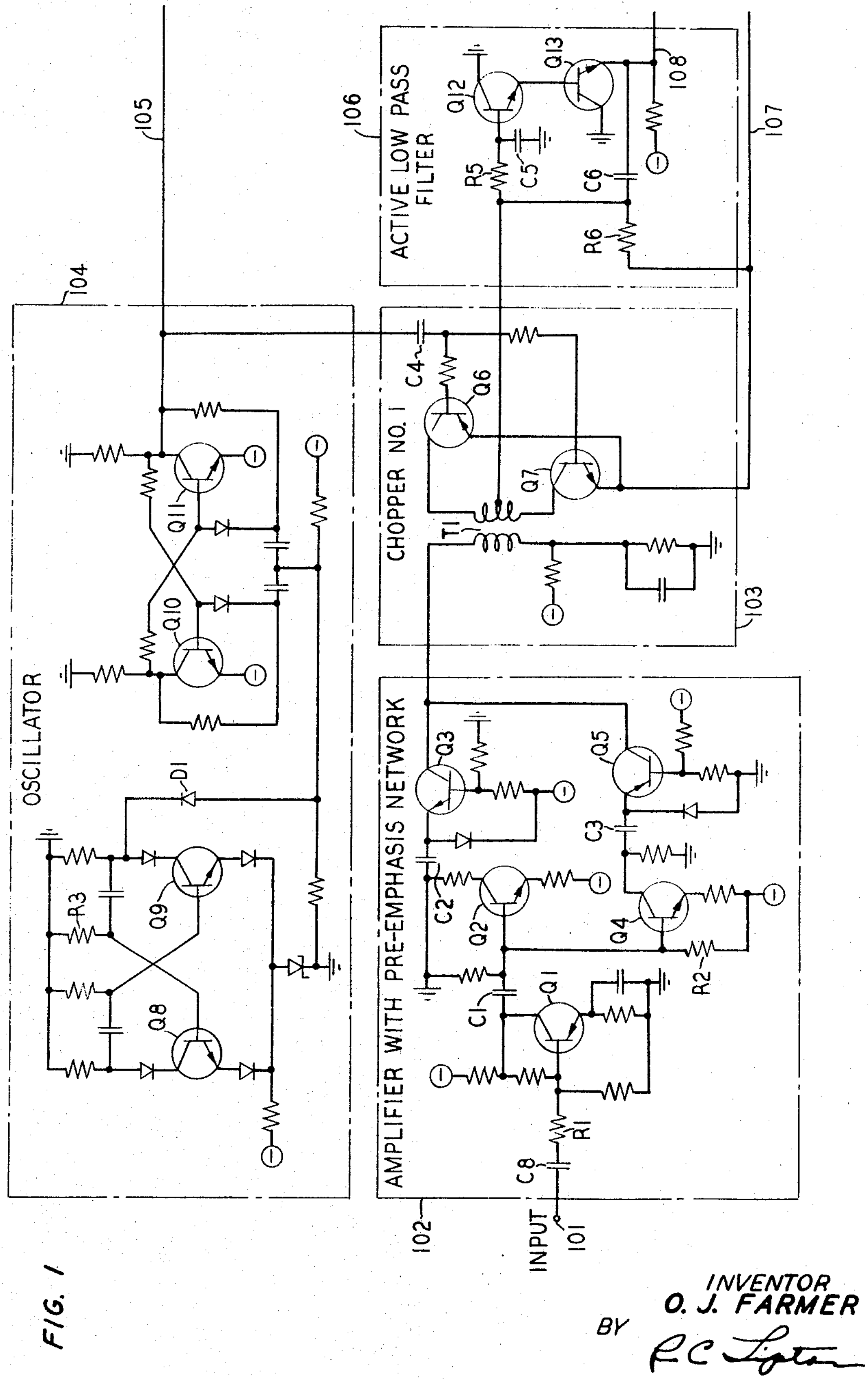

In general, a composite frequency multiplex signal with noise is obtained from an incoming line to be tested by a conventional carrier receiver, not shown. The output of the carrier receiver is then applied to input terminal 101, shown in FIG. 1. Preferably, the carrier receiver includes an AGC amplifier. This maintains the total power of the composite signal relatively constant, thus eliminating the need for compensating for variations in the magnitude of the slot power which fluctuate with the variations in the total power of the composite frequency multiplex signal.

The signal on input terminal 101 is first passed to an amplifier, generally indicated by block 102. As described in detail hereinafter, amplifier 102 provides amplification of the composite signal and pre-emphasis of the signal to increase the magnitude of the signal 6 db per octave with increasing frequency. The output of amplifier 102 is then passed to chopper 103. A second input to chopper 103 is provided by oscillator 104.

Oscillator 104 is arranged to generate a square wave having odd harmonics coinciding with the slot center frequencies of the composite frequency multiplex signal. Accordingly, the signal from amplifier 102 is multiplied by the odd harmonics of the square wave obtained by oscillator 104. Thus, in chopper 103, each of the several slot signals of the composite signal is translated down in frequency to near DC at the output of the chopper while the several channel signals are concurrently translated down but do not produce signals at or in the immediate vicinity of DC. Thus, the low frequency portion of the signal at the output of the chopper represents the sum of the signals of the several slots. As is well known in the art, the magnitude of the product with the various harmonics of the square wave chopping signal at the output of chopper 103 falls-off at a 6 db per octave rate with increasing harmonic frequency. Accordingly, due to the pre-emphasis of amplifier 102, the slot signals are summed with equal weighting.

The output of chopper 103 is passed to active low-pass filter 106. Filter 106 selects the low end of the frequency spectrum, substantially eliminating the signals due to the channel spectrum. The output of filter 106 thus comprises the sum of the slot signals. The random nature of the signal assures that the sum will be on a root mean square so that the power of the signal at the output of filter 106 represents the summed slot power.

Figure 2:
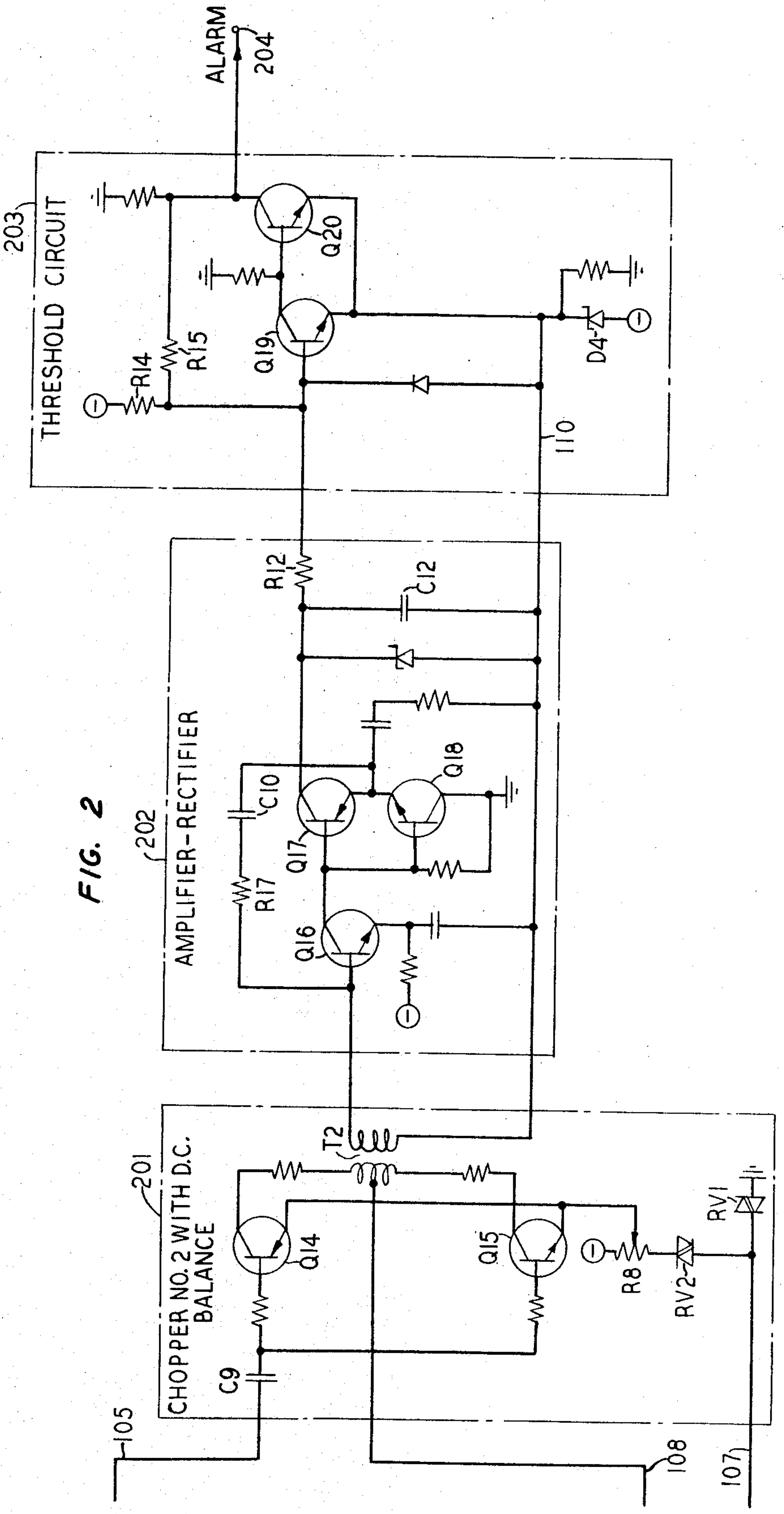

The output of low-pass filter 106 is passed by way of lead 108 to chopper 201 in FIG. 2. At the same time, the output of oscillator 104 is applied by lead 105 to chopper 201. Accordingly, the output of low-pass filter 106 is chopped by the output of oscillator 104. Since there is difficulty in handling the low levels and very low frequencies obtained at the output of low-pass filter 106, this permits the application of an alternating signal to amplifier-rectifier 202, facilitating the measurement of the power in the output of low-pass filter 106.

The chopped slot signal is thereafter amplified and rectified by amplifier-rectifier 202 to provide a DC signal whose magnitude is proportional to the total slot power. Since the magnitude of the total slot power which is acceptable relative to the total power of the composite signal depends upon the number of channels and, therefore, the number of slots present, the gain of amplifier-rectifier 202 is adjusted accordingly.

This DC signal output of amplifier-rectifier 202 is applied to threshold circuit 203. As described hereinafter, the threshold circuit is arranged with hysteresis in the slicing level that decides if the slot power is excessive and that thereafter decides when the noise level is again reduced to an acceptable level. The output of threshold circuit 203 is then applied to alarm terminal 204. This output can, in turn, be passed to any conventional audible or visual alarm, not shown.

Considering the arrangement in detail, the composite frequency multiplex signal with noise, which is on input terminal 101, FIG. 1, and applied to amplifier 102, is therein passed by way of capacitor C8 and resistor R1 to the base of transistor Q1. Transistor Q1 is arranged as a conventional amplifier, thus applying an amplified signal to its collector.

The amplified signal on the collector is passed by way of capacitor C1 to the base of transistor Q2 and in parallel to the base of transistor Q4. Capacitor C1, together with the impedance provided at the bases of transistors Q2 and Q4, which impedance is principally controlled by the magnitude of resistor R2, provides pre-emphasis of the amplified signal passed through capacitor C1. This pre-emphasis is arranged to increase the magnitude of the signal 6 db per octave with increased frequency. This compensates for the fall-off provided by chopper 103 since, as previously described, the magnitude of the product of the amplified composite signal and the various harmonics of the chopping signal provided to chopper 103 must fall-off at a rate of 6 db per octave with increased harmonic frequency.

The outputs of transistor stages Q2 and Q4 are applied in parallel through capacitors C2 and C3, respectively. These signals are then passed to push-pull transistor stages Q3 and Q5. Since the collectors of transistor stages Q3 and Q5 are connected together, a push-pull output is derived and passed to chopper 103.

As previously described, the two inputs to chopper 103 comprise the amplified composite signal with pre-emphasis and the output of oscillator 104. Oscillator 104 generally includes an oscillator stage comprising transistors Q8 and Q9 and a countdown stage comprising transistors Q10 and Q11. The oscillator stage is a conventionally arranged cross coupled transistor oscillator. The frequency of the oscillator is varied by varying the value of resistor R3 to obtain a frequency which is twice the output frequency of the square wave generated by oscillator 104. This output frequency, as previously described, corresponds to one-half the frequency separation of the slots to be measured.

The output of the oscillator stage is passed through diode D1 to the counter stage. This stage provides a countdown of 2 and insures symmetry of the oscillator output. Accordingly, a symmetric square wave is generated by oscillator 104 and applied in parallel to chopper 103 in FIG. 1, and to chopper 201 in FIG. 2, by way of lead 105.

The square wave output of oscillator 104 is applied by way of capacitor C4 in chopper 103 to the base of transistor Q6 and the base of transistor Q7 in parallel. Transistors Q6 and Q7 are switches which are alternately turned on and off by the square wave. This, in turn, alternately connects each end terminal of the secondary winding of transformer T1 to the fixed DC potential on lead 107 by way of either the collector-to-emitter path of transistor Q7 or, alternatively, the emitter-to-collector path of transistor Q6. At the same time, the amplified composite signal with pre-emphasis is applied to the primary winding of transformer T1. Accordingly, the product of the output of oscillator 104 and the composite signal is obtained at the center tap of the secondary winding and passed to active low-pass filter 106. Since the composite signal has been pre-emphasized, the output of the chopper therefore comprises the several signal bands and intervening slots translated in frequency such that the slots are summed with equal weighting at or near DC.

Transistors Q12 and Q13, together with capacitors C5 and C6 and resistors R5 and R6 are arranged as a conventional active low-pass filter. The filtering action is such that all but the lowest few cycles of the signal are eliminated by filter 106. Accordingly, the first few cycles which comprise the summed slot power are passed to output lead 108 while the channel signals are eliminated. The output signal on lead 108 is passed to chopper 201.

As previously disclosed, the output of oscillator 104 is applied by way of lead 105 to chopper 201 in FIG. 2 with the output of filter 106 passed to chopper 201 by way of lead 108 to produce a square wave signal having a magnitude varied by the magnitude of the signal on lead 108. Specifically, the square wave output of oscillator 104 on lead 105 is passed by way of capacitor C9 to the bases of transistors Q14 and Q15 in chopper 201. The transistors alternately turn on to apply, in turn, a square wave across the primary winding of transformer T2. With the output of filter 106 on lead 108 connected to the center tap of the primary winding of transformer T2, the secondary winding of transformer T2 produces a square wave modified in amplitude in accordance with the signal on lead 108. It is noted that the emitters of transistors Q14 and Q15 are connected to a voltage divider comprising potentiometer R8 and reversing poled diodes RV1 and RV2. Since the voltage across diodes RV1 provides the potential for lead 107 which, in turn, provides the DC reference for chopper 103, and, further, since the DC signal on lead 108 is related to the potential on lead 107 modified by the voltage drop across transistors Q12 and Q13, potentiometer R8 and diodes RV2 are arranged to provide a compensating direct-current offset to this voltage drop. Therefore, there is a direct-current balance between the signal on lead 108 and the voltages on the emitters of Q14 and Q15.

The square wave output of chopper 201 is passed to the base of transistor Q16 in amplifier-rectifier 202. The collector of transistor Q16 is connected to the base of transistor Q17 and, in parallel, to the base of transistor Q18. Transistors Q17 and Q18 are arranged in push-pull relationship. The signal at the emitters of transistors Q17 and Q18 is an inverted replica of the input signal, thereby providing negative feedback by way of capacitor C10 and resistor R17. Resistor R17 provides impedance to the feedback and thus controls the gain of amplifier-rectifier 202. The magnitude of the impedance of resistor R17 is a function of the number of channels in the composite signal. Since transistor Q17 comprises one-half of the push-pull stage, the signal on its collector comprises a half-cycle signal and thus a half-wave rectifier output. Resistor R12 and capacitor C12 provides low-pass filtering action for the rectified signal. The filter output is passed to threshold circuit 203.

In threshold circuit 203, transistors Q19 and Q20 are arranged as a trigger or slicer circuit. The threshold of the circuit is determined by breakdown diode D4 and resistor R14. In the normal condition amplifier-rectifier 202 does not provide sufficient current to the base of the transistor Q19 to maintain it conductive. Transistor Q19 is, therefore, normally off, maintaining transistor Q20 on. Accordingly, with transistor Q20 on, a relatively high negative potential is applied from its collector to output alarm terminal 204.

Assume now an increase in the slot power and a corresponding increase of current output from amplifier-rectifier 202. As the current increases, the potential at the base of transistor Q19 is raised until a threshold is exceeded whereby the transistor turns on. This, in turn, reduces the potential at the base of transistor Q20, turning it off. Accordingly, the potential at the collector of transistor Q20 is raised, which potential is applied to alarm terminal 204. In addition, the increased potential is passed back by way of resistor R15 to the base of transistor Q19, tending to maintain threshold circuit 203 in the alarm condition. Threshold circuit 203 is thereafter turned off when the current from amplifier-rectifier 202 is reduced sufficiently to starve transistor Q19. This turns transistor Q19 off, turning on, in turn, transistor Q20, thus restoring the threshold circuit 203 to the initial condition.

Although a specific embodiment of this invention has been shown and described, it will be understood that various modifications may be made without departing from the spirit of this invention and within the scope of the appended claims.

I claim:

1. In a monitor for estimating the amount of noise in a frequency multiplex carrier signal by measuring the power in slots between channels, the center frequencies of successive ones of said slots being separated by identical number of Hertz, means for translating the signals in each of said slots to low frequency signals and means for detecting said translated signals, characterized in that said translating means includes means for generating a wave having odd harmonics which coincide with the center frequencies of said slots and means for multiplying said wave and said carrier signal.

2. In a monitor in accordance with claim 1 wherein said generating means comprises a square wave generator.

3. In a monitor in accordance with claim 2 wherein said multiplying means comprises means responsive to said square wave generator for chopping said carrier wave.

4. In a monitor in accordance with claim 3 wherein said translating means includes means for preemphasizing said carrier signal with increasing frequency to compensate for the fall-off of the output of said chopping means.

5. In a monitor in accordance with claim 1 wherein said translating means includes means for summing said translated signals in each of said slots with said translated signals in others of said slots.

6. In a monitor in accordance with claim 1 wherein said translating means includes low-pass filter means connected to the output of said multiplying means for eliminating signals due to said channels.

References Cited

UNITED STATES PATENTS 3,017,506 1/1962 Judy ---------------- 325—436

KATHLEEN H. CLAFFY, Primary Examiner

D. W. OLMS, Assistant Examiner

U.S. Cl. X.R.

179—175.3